United States Patent [19]
White et al.

[11] Patent Number: 6,106,423
[45] Date of Patent: Aug. 22, 2000

[54] DUAL TENSIONER SYSTEM FOR BALANCE SHAFT DRIVE

[75] Inventors: David C. White, Dryden; Kevin B. Todd, Freeville; Randy J. McDonald, Ithaca; Michael Marsh, Dryden, all of N.Y.

[73] Assignee: BorgWarner Inc., Troy, Mich.

[21] Appl. No.: 09/286,053

[22] Filed: Apr. 5, 1999

[51] Int. Cl.[7] .............................. F16H 7/08; F16H 7/22; F16H 7/18
[52] U.S. Cl. .......................... 474/109; 474/111; 474/140
[58] Field of Search .................................. 474/101, 109, 474/110, 111, 140

[56] References Cited

U.S. PATENT DOCUMENTS

| | | | |
|---|---|---|---|
| 4,480,603 | 11/1984 | Tsuboi | 123/90.31 |
| 5,346,436 | 9/1994 | Hunter et al. | 474/110 |
| 5,462,493 | 10/1995 | Simpson | 474/111 |
| 5,653,562 | 8/1997 | Simpson | 474/110 |
| 5,720,682 | 2/1998 | Tada | 474/91 |

Primary Examiner—David A. Bucci
Assistant Examiner—Matthew A. Kaness
Attorney, Agent, or Firm—Sidley & Austin; Greg Dziegielewski

[57] ABSTRACT

A chain tensioning system includes a pair of tensioners located one on each side of a driving sprocket, such as a crankshaft sprocket, between the driving sprocket and each of two driven sprockets, such as balance shaft sprockets. The dual tensioning system provides a tensioner to absorb torsional vibrations from the driving shaft in each of the two relative rotational directions of the driving shaft.

14 Claims, 5 Drawing Sheets

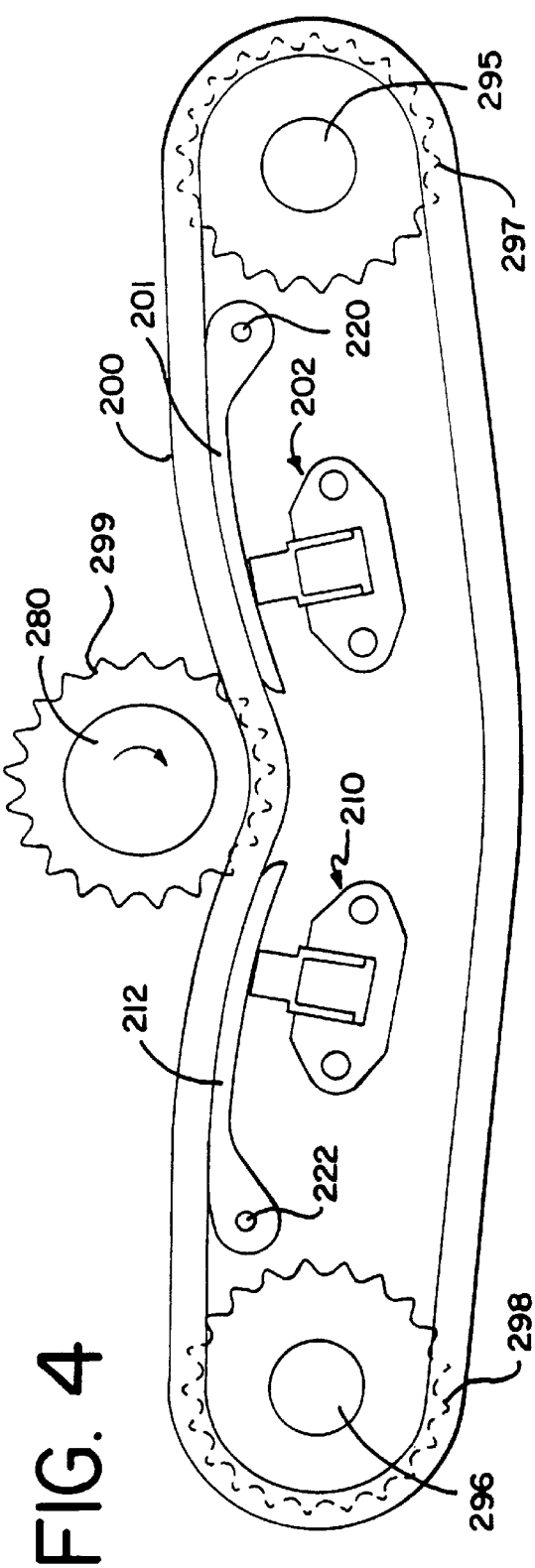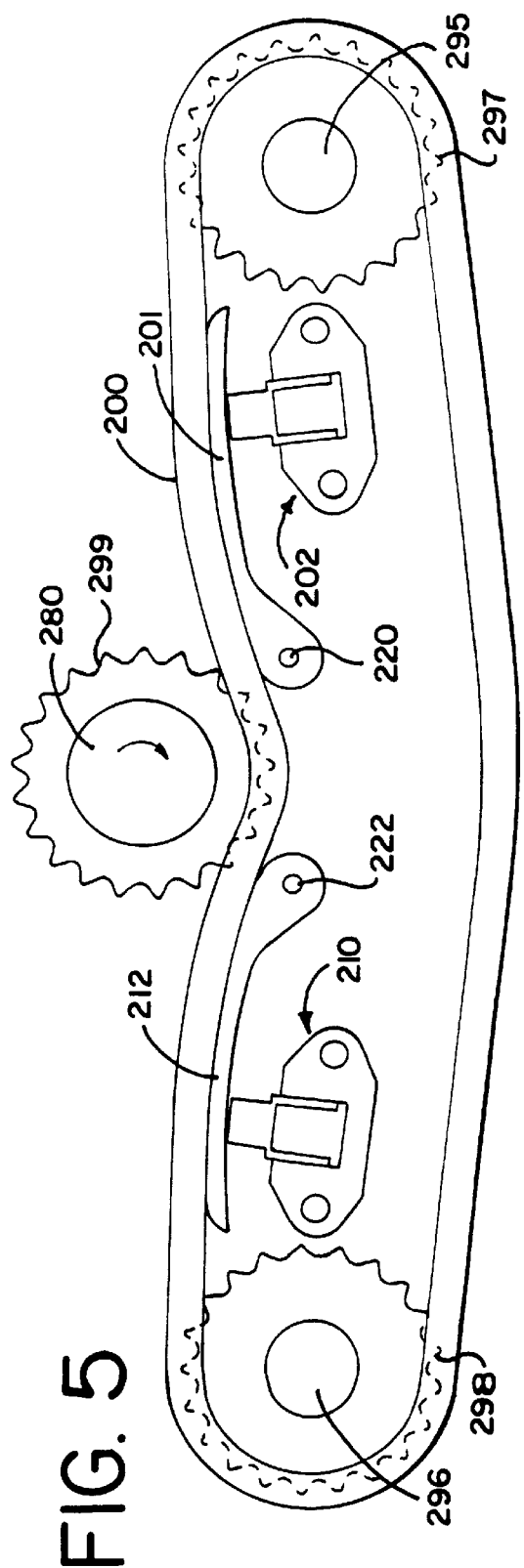

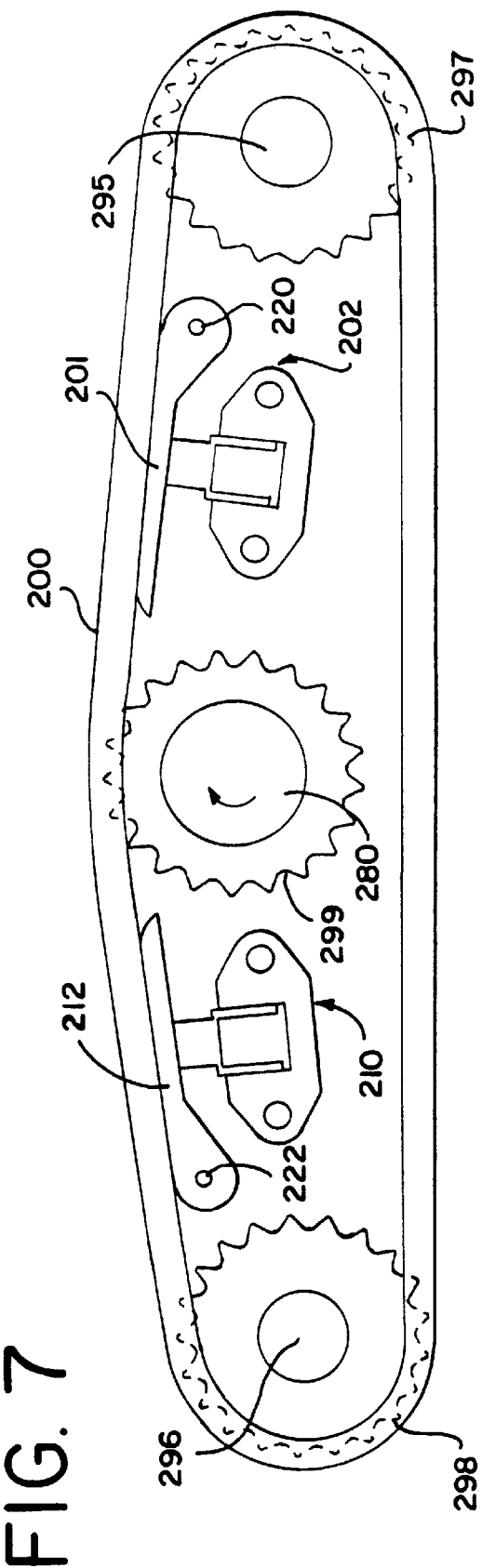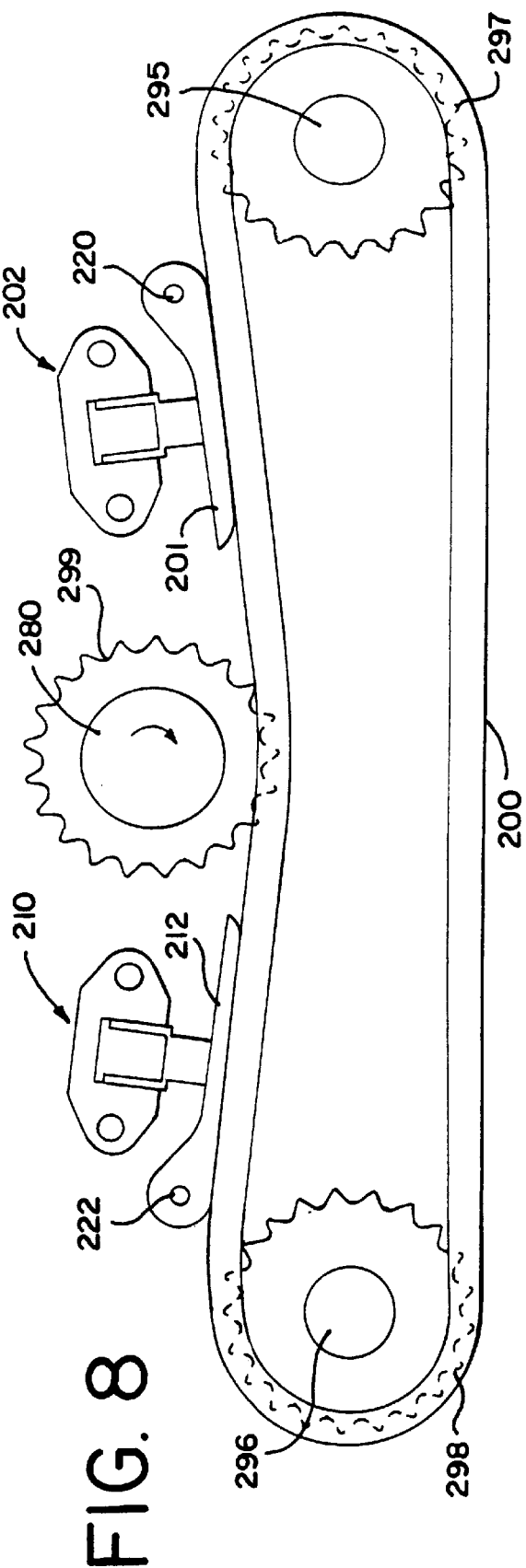

DUAL TENSIONER SYSTEM FOR BALANCE SHAFT DRIVE

BACKGROUND OF THE INVENTION

This invention relates to tensioners used with chain drives in automotive timing applications and more particularly to a dual tensioner system for a timing system that includes a balance shaft drive.

Tensioning devices are used as a control device for a power transmission chain as the chain travels between a plurality of sprockets. Generally, it is important to impart and maintain a certain degree of tension to the chain to prevent noises or slippage. Prevention of slippage is especially important in the case of a chain driven camshaft in an internal combustion engine because slippage may alter the camshaft timing by several degrees, possibly causing damage. In the harsh environment in which an internal combustion engine operates, chain tension can vary between excessively high or low levels as a result of the wide variations in temperature and differences between the coefficients of linear expansion among the various parts of the engine, including the chain and the tensioner. Camshaft and crankshaft induced torsional vibrations cause chain tension to vary considerably. This tension variation results in chain elongation. Moreover, wear of the chain components during prolonged use can cause elongation of the chain that results in a decrease in the tension of the chain.

In conventional engine timing systems, a tensioner arm is placed together with a hydraulic tensioner on the slack side of the timing chain and a chain guide is placed on the tight side. An example of such a conventional system is shown in FIG. 1. The engine has two separate banks of cylinders, each of which operates in a similar manner. Each engine bank has its own camshaft 4, 5, and camshaft sprockets 6, 7. The camshaft sprockets are connected to and driven by a crankshaft 2 through endless timing chains 8, 9 that are wrapped around the camshaft sprockets 6, 7 and the crankshaft sprockets 3, 3a.

The engine has a single crankshaft 2, but two crankshaft sprockets 3, 3a. One sprocket 3a is behind the other sprocket 3 in FIG. 1. One timing chain is wrapped around sprockets 3, 6 and the other timing chain is wrapped around sprockets 3a, 7. The arrow mark in FIG. 1 indicates the rotational direction of the crankshaft 2.

Tensioner arms 10, 20, which are designed to apply tension to the chains, and chain guides 30, 40, which are designed for regulating and controlling the running position of the timing chains, are placed on the slack side and tight side of the timing chains, respectively. The tensioner arms include a main body portion 11 and a shoe 12, which is made of rubber, resin or nylon. The shoes are mounted on the main body 11 on the chain contact side of each tensioner arm 10, 20. Bolt 13, which provides rotatable support for the arm body 11, is inserted in the hole formed in one end of the arm body 11. The bolt is fixed to the sidewall of the engine. The hydraulic tensioner 15 is placed on the opposite (free end) of the arm body 11 and its piston 15a presses the arm body toward the chain contact side.

Similar to the tensioner arms 10, 20, the chain guides 30, 40 are comprised of a main body portion 31, which is conventionally made of aluminum die cast, for example, and shoes 32 made of rubber, resin or nylon. The shoes 32 are mounted on the chain contact side of the guide body 31. The guide body is fixed to the engine sidewall by bolts 33 inserted in the holes at both ends.

FIG. 2 illustrates the use of tensioners and chain guides in another type of engine, specifically the timing system of an in-line dual overhead cam engine. In FIG. 2, the crankshaft 80 is attached to the drive sprocket 83 and the camshafts 81 and 82 are attached to the driven sprockets 84, 85, respectively. The timing chain 86 is wrapped around the driving sprocket 83 and the driven sprockets 84, 85. The tensioner arm 87 and the tensioner 88 are placed on the slack side of the timing chain 86 and the chain guide 89 is placed on the tight side of the timing chain 86. This tensioner arm 87, tensioner 88 and chain guide 89 are comprised in the same manner as tensioner arm 10, tensioner 15 and chain guide 40 of FIG. 1.

Chain guide 90 for guiding the timing chain is located between the driven sprockets 84, 85. Aperture 91 relates to providing lubrication of the chain and is not related to the present invention.

FIG. 3 illustrates the use of tensioners and chain guides in a conventional engine timing system that includes a balance shaft drive. In FIG. 3, the balance chain 100 is positioned around driven sprockets 97, 98 on the balance shafts 95 and 96, respectively, and the driving sprocket 99. Tensioner arm 101 and tensioner 102 are positioned on the slack side of the balance chain 100 and the chain guide 103 is positioned on the tight side of the balance chain 100. A chain guide 104, for guidance of the balance chain 100, is also placed between the driven sprockets 97, 98. Apertures 105, 106 in the chain guide 104 relate to discharge of oil from the tensioner and are not related to the present invention.

The present invention relates to a modification of the balance shaft drive system of FIG. 3. In such balance shaft drive systems, typically only a single tensioner, shown as tensioner 102 and arm 101, is used in the drive system. In such a system that has large crankshaft torsional loads and vibrations, however, a single tensioner is inadequate to provide proper tensioning of the system. Such torsional vibrations cause the balance shafts to rotate in clockwise and then counterclockwise directions (relative to the rotation of the system in the clockwise direction). One example of a system providing these high torsional loads is a twin cylinder engine. Another example of an application which would benefit from this system would be a multi-cylinder in-line diesel engine. The present invention is directed to providing a second tensioner in a balance shaft drive to maintain proper tension in the system. However, the present invention is not necessarily intended to be limited to a particular engine configuration or to balance shaft drives.

SUMMARY OF THE INVENTION

The present invention relates to a chain tensioner system in which a pair of tensioners are used in a balance shaft drive of an engine timing system. Specifically, a tensioner is placed on each side of the crankshaft between the crankshaft sprocket and each of the two balance shaft sprockets. As the crankshaft attempts to rotate clockwise, the slack in the chain is minimized or reduced by one of the tensioners. As the crankshaft attempts to rotate counterclockwise (relative to the system) as a result of torsional vibrations, the tensioner on the other side of the crankshaft minimizes or reduces the slack created in the chain.

The pair of tensioners is being used to isolate the motion of the crankshaft from the remainder of the balance drive. The use of multiple tensioners permits the speed and torsional excitations of the crankshaft to fluctuate independently from the remainder of the system.

The tensioning system of the present invention finds particular application in timing drives that have short center distances between the balance shafts. Additionally, in balance shaft drives, often the chain is required to wrap the backside of a sprocket adjacent another sprocket. The present system assists in handling the large amounts of chain wear or chain elongation that can occur in a short chain span, and to handle that elongation in each of the two different chain strands simultaneously.

BRIEF DESCRIPTION OF THE DRAWINGS

FIG. 4 is a side schematic view of the tensioning system of the present invention in a balance shaft drive.

FIG. 5 is a side schematic view of a second embodiment of the tensioning system of the present invention in a balance shaft drive.

FIG. 7 is a side schematic view of a fourth embodiment of the tensioning system of the present invention in a balance shaft drive.

FIG. 8 is a side schematic view of a fifth embodiment of the tensioning system of the present invention in a balance shaft drive.

DETAILED DESCRIPTION OF THE PREFERRED EMBODIMENTS

Figure 1:
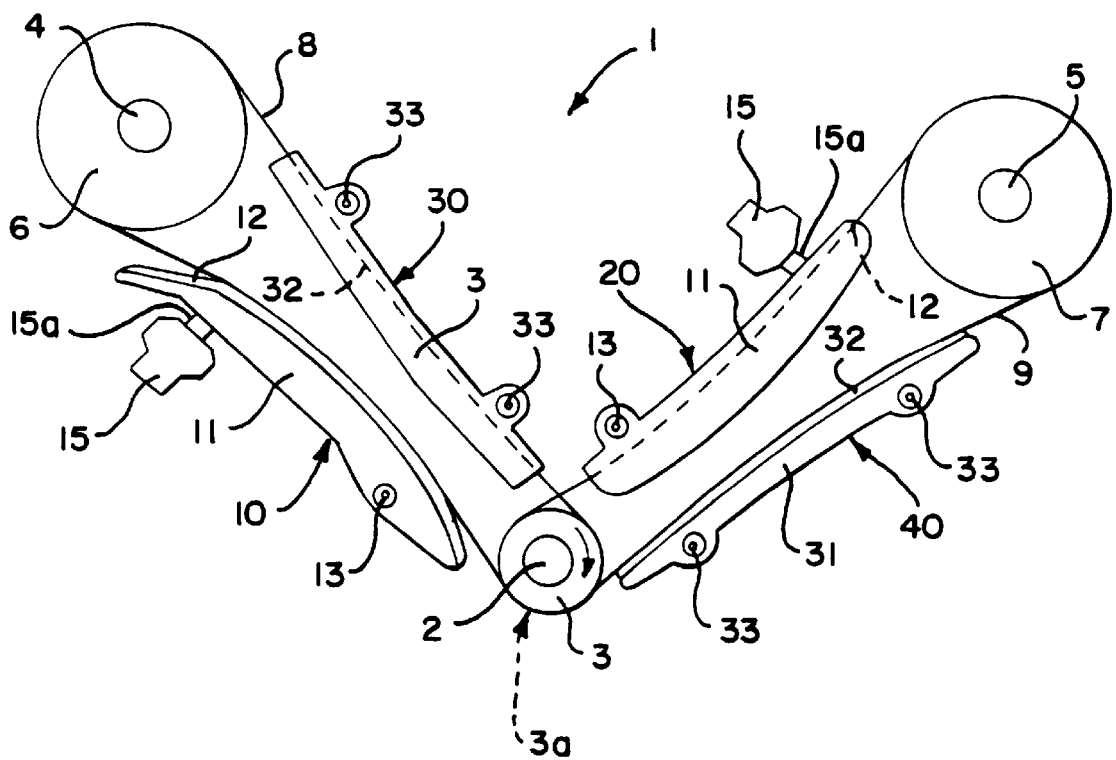
FIG. 1 is a side view of a tensioning system of the prior art illustrating a V-type engine timing system with tensioners and chain guides on each of two chains.
Figure 2:
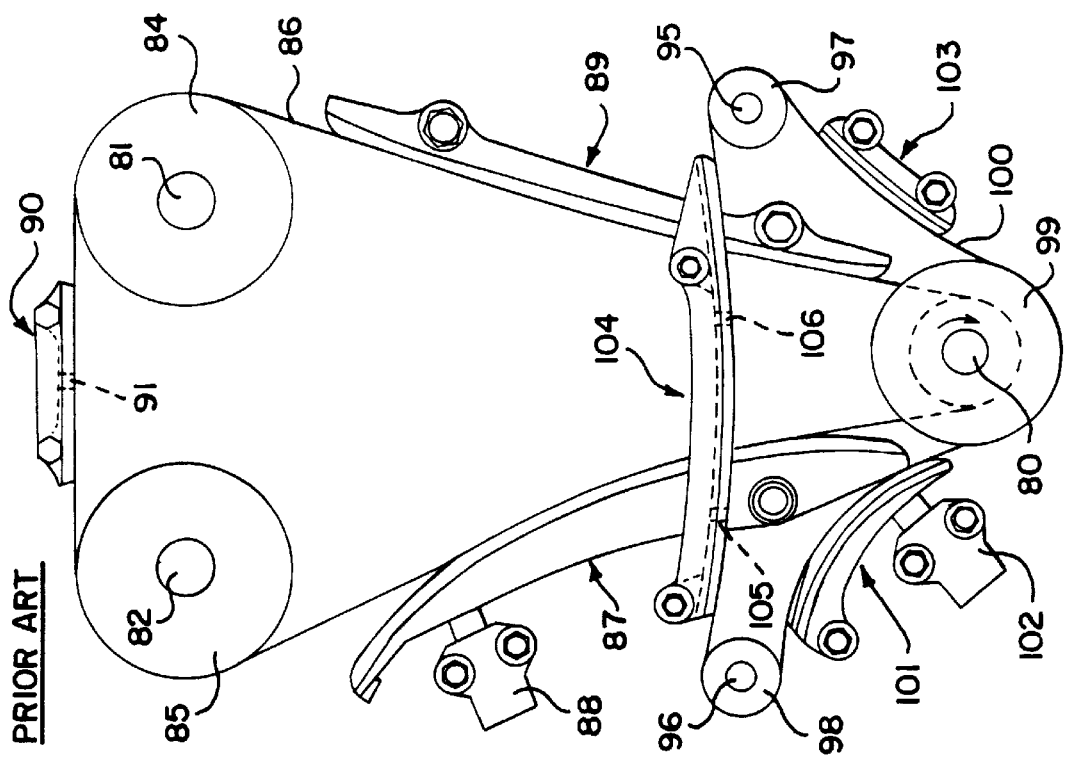
FIG. 2 is a side view of a tensioning system of the prior art illustrating a timing system for an engine with dual overhead camshafts.
Figure 3:
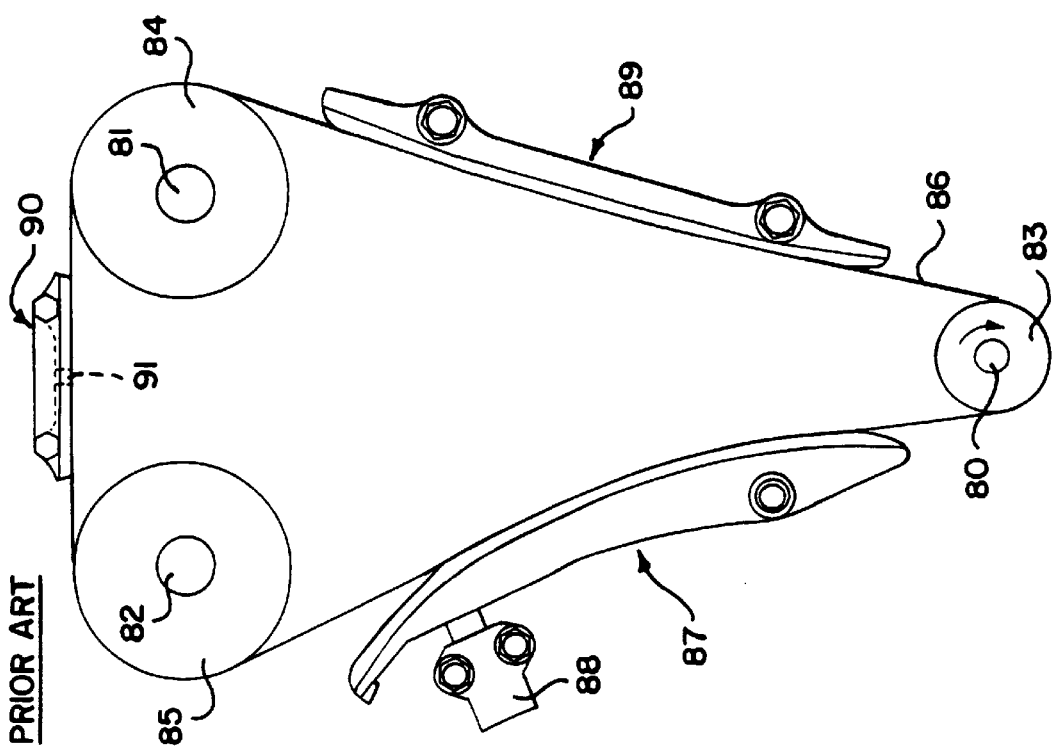
FIG. 3 is a side view of a tensioning system of the prior art illustrating a timing system for an engine having a balance shaft drive.

Turning now to the drawings, FIG. 4 illustrates a preferred embodiment of the tensioning system in a balance shaft drive of an engine timing system. FIG. 3 illustrates an balance shaft drive in an engine timing system of the prior art, in which a single tensioner 102 and tensioner arm 101 are used in the balance shaft drive. In the system of the present invention, shown in FIG. 4, the balance shaft drive tensioning system includes a pair of tensioners and associated tensioner arms.

In FIG. 4, the balance shaft chain 200 is driven by a crankshaft sprocket 299, which is mounted on crankshaft 280. The chain 200 is wrapped around balance shaft sprockets 297, 298, which are located on balance shafts 295 and 296, respectively. A first tensioner 202 and associated tensioner arm 201 are located between the crankshaft sprocket 299 and one balance shaft sprocket 297. A second tensioner 210 and associated tensioner arm 212 are located between the crankshaft sprocket 299 and the other balance shaft sprocket 298.

Each tensioner arm is pivoted along a pivot point located away from the crankshaft sprocket. That is, tension arm 201 is pivoted at pivot point 220 and tension arm 212 is pivoted at pivot point 222. In this manner, the tension arms 201, 212, and tensioners 202, 210 isolate the crankshaft sprocket from the system and provide a regulation of tension to each span of chain between the crankshaft and the balance shafts regardless of the direction of relative rotation of the crankshaft sprocket.

In another embodiment, shown in FIG. 5, each tensioner arm is pivoted along a pivot point located near the crankshaft sprocket. Thus, as in FIG. 4, tension arms 201, 212 pivot at pivot points 220, 222 respectively. The difference in FIG. 5 being the orientation of the pivot points 220, 222 being located near crankshaft sprocket 299. Tensioners 202, 210 located between pivot points 220, 222 and balance shaft sprockets 297, 298 bear on tension arms 201, 212 respectively.

Figure 6:
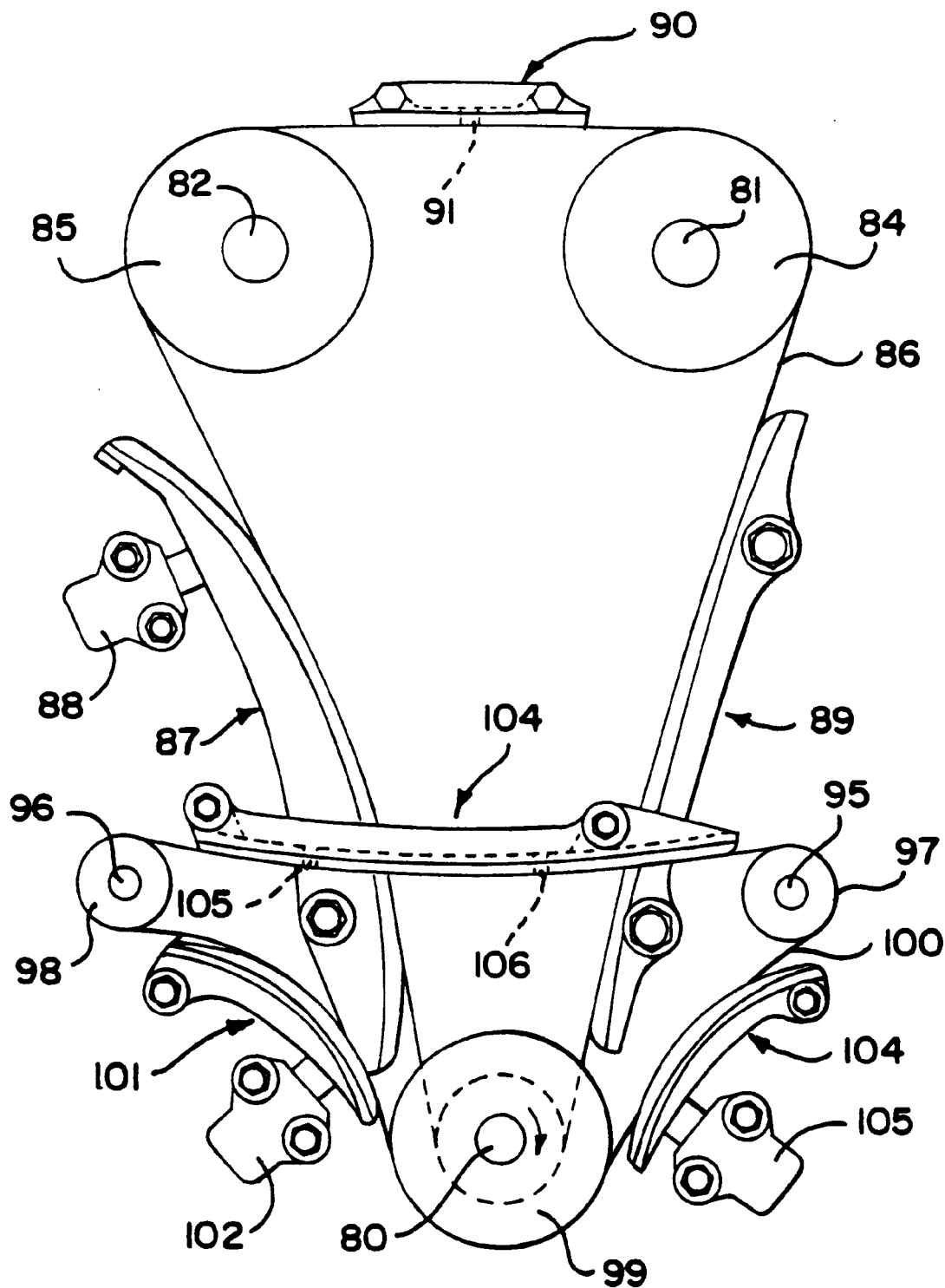
FIG. 6 is a side view of another third embodiment of the tensioning system of the present invention in a balance shaft drive.

In another embodiment, shown in FIG. 6, a pair of tensioners and tensioner arms may be located on the outside portion of the chain. While the crankshaft sprocket is shown outside the loop of endless chain in FIG. 4 and FIG. 5, the crankshaft sprocket may be located inside the loop of endless chain. Thus, the balance chain 100 is positioned around the outside of driven sprockets 97, 98 located on balance shafts 95 and 96, respectively, and the driving sprocket 99. Tensioner arm 101 and tensioner 102 are positioned on the outside of the balance chain 100 on a first side of crankshaft sprocket 99 and tensioner arm 104 and tensioner 105 are located on the outside of the balance chain 100 on a second side of crankshaft sprocket 99. Both tensioner assemblies comprising a tensioner arm and an associated tensioner are positioned between the crankshaft sprocket and a respective balance shaft sprocket.

A chain guide, such as 104 shown in FIG. 6, may be used along the side of the balance shaft chain that spans the distance between each of the balance shafts.

In another embodiment, shown in FIG. 7, the pair of tensioner systems are located inside the loop of endless chain as shown in FIG. 4. Crankshaft sprocket 299, however, is also located inside the loop of endless chain 200. In another embodiment, shown in FIG. 8, both the pair of tensioner systems and the crankshaft sprocket are located outside the loop of endless chain.

A conventional hydraulic tensioner of the prior art, which can be utilized with the system of the present invention, is shown in Hunter U.S. Pat. No. 5,346,436, which is incorporated herein by reference. The hydraulic tensioner includes a piston that extends upward to apply pressure on the free end of the tensioner arm. The tensioner typically includes a housing having a central bore that forms a fluid chamber with the interior of the piston. The fluid chamber is supplied with fluid through a passageway from a pressurized fluid source. The fluid source may be an oil pump or a reservoir. Fluid travels into the fluid chamber through a one-way check valve. Check valves are well-known in the tensioner art.

A spring typically contacts the inside of the piston causing the piston to be biased or move axially in a protruding or outward direction from the housing bore. The upper end of the piston contacts the arm to provide tension on the arm which in turn applies tension along the chain strand.

In operation, upon start-up, the piston of the hydraulic tensioner is biased outward by the spring, which causes the check valve to open to permit fluid to enter the fluid chamber. As the chain tightens, the inward force of the chain is balanced by the resisting force of the spring and hydraulic fluid that fills the chamber. Once the forces are relatively balanced, the check valve closes and no more fluid enters the chamber. The piston acts outwardly against the center or the free end of the tensioner arm. The tensioner arm pivots about the pivot point and moves outward by the force of the piston.

Those skilled in the art to which the invention pertains may make modifications and other embodiments employing the principles of this invention without departing from its spirit or essential characteristics, particularly upon the foregoing teachings. The described embodiments are to be considered in all respects only as illustrative and not restrictive, and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. An engine timing system, comprising:

a series of shafts, including a crankshaft, a first camshaft, and a first balance shaft;

said crankshaft including a first crankshaft sprocket mounted thereon, said first camshaft including a first camshaft sprocket mounted thereon, and a first endless timing chain wrapped about said first crankshaft sprocket and said first camshaft sprocket to provide a driving connection therebetween;

said crankshaft including a second crankshaft sprocket mounted thereon, said first balance shaft including a first balance shaft sprocket mounted thereon, and a second endless timing chain wrapped about said second crankshaft sprocket and said first balance shaft sprocket to provide a driving connection therebetween;

said second crankshaft sprocket having a first side on which said second timing chain travels toward said second crankshaft sprocket, said second crankshaft sprocket having a second side on which said second timing chain travels away from said second crankshaft sprocket;

first and second hydraulic tensioners, said first hydraulic tensioner having a first tensioner arm associated therewith, said second hydraulic tensioner having a second tensioner arm associated therewith, said first and second tensioner arms being biased in the direction of said second timing chain to provide tension against said second timing chain;

said first tensioner and tensioner arm being located along said second chain along said first side of said second crankshaft sprocket between said second crankshaft sprocket and said first balance shaft sprocket, said second tensioner and tensioner arm being located along said second chain along said second side of said crankshaft sprocket.

2. The timing system of claim 1 further comprising:

a second balance shaft having a second balance shaft sprocket mounted thereon, said second timing chain being wrapped around said second balance shaft sprocket;

said second tensioner and tensioner arm being located along said second chain along said second side of said second crankshaft sprocket between said second crankshaft sprocket and said second balance shaft sprocket.

3. The timing system of claim 2 further comprising a second camshaft having a second camshaft sprocket mounted thereon, said first timing chain being wrapped around said second camshaft sprocket.

4. The timing system of claim 2 wherein said endless second timing chain forms a loop having an inside portion and an outside portion, said second crankshaft sprocket being located along said inside portion of said loop of said second timing chain.

5. The timing system of claim 4 wherein said first and second tensioners and associated tensioner arms are located along said outside portion of said loop of said second timing chain.

6. The timing system of claim 4 wherein said first and second tensioners and associated tensioner arms are located along said inside portion of said loop of said second timing chain.

7. The timing system of claim 2 wherein said endless second timing chain forms a loop having an inside portion and an outside portion, said second crankshaft sprocket being located along said outside portion of said loop of said second timing chain.

8. The timing system of claim 7 wherein said first and second tensioners and associated tensioner arms are located along said outside portion of said loop of said second timing chain.

9. The timing system of claim 7 wherein said first and second tensioners and associated tensioner arms are located along said inside portion of said loop of said second timing chain.

10. The tensioning system of claim 9 wherein said driven shafts are balance shafts and said driving shaft is a crankshaft.

11. The tensioning system of claim 9 wherein said driven shafts are balance shafts, said driving shaft being a crankshaft, said crankshaft also driving at least one camshaft.

12. The timing chain system of claim 2 wherein said first tensioner arm pivot point is located between said first tensioner and said first balance shaft sprocket, said second tensioner arm pivot point is located between said second tensioner and said second balance shaft sprocket.

13. The timing chain system of claim 2 wherein said first tensioner arm pivot point is located between said first tensioner and said crankshaft sprocket, and said second tensioner arm pivot point is located between said second tensioner and said crankshaft sprocket.

14. A tensioning system for a chain and sprocket power transmission system, said tensioning system comprising:

a driving shaft having a driving sprocket mounted thereon, at least first and second driven shafts having first and second driven sprockets mounted on respective driven shafts, and an endless chain wrapped about said driving sprocket and said first and second driven sprocket to form a power transmission system between said driving shaft and said driven shafts;

said driving sprocket having a first side on which said chain travels toward said driving sprocket, said driving sprocket having a second side on which said chain travels away from said driving sprocket;

first and second hydraulic tensioners, said first hydraulic tensioner having a first tensioner arm associated therewith, said second hydraulic tensioner having a second tensioner arm associated therewith, said first and second tensioner arms being biased in the direction of said chain to provide tension against said chain;

said first tensioner and tensioner arm being located along said chain along said first side of said driving sprocket between said driving sprocket and said first driven sprocket, said second tensioner and tensioner arm being located along said chain along said second side of said driving sprocket between said driving sprocket and said second driven sprocket.

* * * * *